United States Patent [19]

McClintock

[11] Patent Number: 4,601,226

[45] Date of Patent: Jul. 22, 1986

[54] SLIDE TABLE FOR POWER SAWS

[76] Inventor: Maurice L. McClintock, 628 Hendricks, Anderson, Ind. 46016

[21] Appl. No.: 641,805

[22] Filed: Aug. 17, 1984

[51] Int. Cl.[4] ............................................. B27B 5/16
[52] U.S. Cl. ........................................ 83/415; 83/425; 83/477; 83/409; 108/143
[58] Field of Search ................ 83/471.2, 486.1, 859, 83/467, 452–454, 471.3, 412–414, 409, 415, 437; 144/287; 108/143

[56] References Cited

U.S. PATENT DOCUMENTS

| Re. 18,201 | 9/1981 | Messmer | 83/467 |
|---|---|---|---|
| 2,445,676 | 7/1948 | Lasar | 83/412 X |
| 3,538,963 | 11/1970 | Adams | 83/415 |
| 3,595,287 | 7/1971 | Indermark | 83/437 X |
| 4,161,974 | 7/1979 | Patterson | 83/471.2 X |
| 4,283,977 | 8/1981 | Batson | 83/453 |
| 4,379,419 | 4/1983 | Woock et al. | 83/859 X |
| 4,510,980 | 4/1985 | Bartlett et al. | 144/287 X |

Primary Examiner—James M. Meister
Assistant Examiner—John L. Knoble
Attorney, Agent, or Firm—John H. Calhoun, Jr.

[57] ABSTRACT

A slide table comprising a table top slidably mounted on a pair of guide rails and having a plurality of recesses in the top surface of the table top to receive dowel pins that serve as a fence. Clamps for holding work pieces may be screwed into tee-nuts that are fixed in the table top. Slide collars are provided on the bottom of the table top, which collars partially encircle the guide rails and allows for lengthwise sliding movement of the table top on the guide rails while severely restricting vertical and lateral movement of the table top relative to the guide rails. The guide rails are attachable to the base of a radial arm power saw, and the ends of the guide rails are supported on adjustable height legs. Work pieces are positioned against the fence pins and tightly clamped to the table top. An operator feeds work to a saw by pushing or pulling on handles that are attached to the table top.

2 Claims, 7 Drawing Figures

SLIDE TABLE FOR POWER SAWS

BACKGROUND OF THE INVENTION

Radial power saws are well known and are commonly used by craftsmen to perform a variety of tasks. In all cases where such saws are used it is necessary to support work pieces while at the same time feeding the work pieces to the saw. Most radial saws are provided with a short base or table that can be used to support work pieces. A fence is commonly provided for positioning work pieces. The most common practice is to push work pieces against the fence by hand while at the same time hand feeding the work pieces into the saw. At the end, a push rod is frequently used to complete the job and it is not uncommon for the work to fall on the floor after a cut is completed. Some people do not use a push rod, but rather go to the lead end of the work and pull the boards through the saw.

Present methods of supporting and feeding work pieces to a radial saw are not entirely satisfactory for several reasons. There is a constant risk that failure of a workman to promptly remove his hand from work pieces as he feeds work to a saw will result in injury. There have been occasions when a workman's hand or arm has been drawn into a saw, and on other occasions saws have kicked work pieces into a workman's stomach as he pulled the work pieces through the saw. It is very difficult to push a work piece against a fence and at the same time feed it into a saw. As a result cuts on radial saws tend to be very uneven, and close tolerance work is all but impossible. Also, improperly supported work pieces tend to feed unevenly into a saw, and as a cut nears its end a work piece may suddenly shift, bend, break, flip or fall, doing damage to the work piece or injury to the workman. A relatively common solution to these problems is to provide a saw table that is approximately twice the length of work pieces being fed into the saw, thereby providing support for work pieces at all times. Such tables take up a lot of room, are difficult to store or ship, and do not address the need for uniformly feeding work into a saw and the need to keep workmen's hands away from saw blades.

Saw tables of a variety of types are known in the prior art as shown in U.S. Pat. No. 3,151,642 issued on Oct. 6, 1964 to Eugene T. Olson which shows an angularly shiftable saw mount that is adapted to be readily mounted on most conventional power-driven hand saws and that is adapted for sawing panel boards such as ply wood. U.S. Pat. No. 4,007,657 issued on Feb. 15, 1977 to Andrew E. Burch shows a saw table having a pair of guides above a base for guiding a power saw as it cuts a fixed work piece. U.S. Pat. No. 4,068,551 issued on Jan. 17, 1978 to Lloyd D. Kreitz shows a folding extension table for accommodating comparatively long work pieces as they are fed into a radial arm saw. U.S. Pat. No. 4,327,619 issued on May 4, 1982 to John J. McNamee, Jr. shows a cutting table for cutting house siding in which a power saw is held on a guide rotated to make miter cuts in siding held on a table against a rail.

SUMMARY OF THE INVENTION

The present invention provides a novel and especially useful slide table for conveniently, safely, and uniformly feeding work pieces into a radial arm saw. The table of the present invention has all the advantages of the saw tables known in the prior art, and in addition provides several distinct and important advantages not provided by existing saw tables. One object of the present invention is to provide a saw table that eliminates the need for an operator to hand feed or pull work pieces into a saw. Another object of the present invention is to provide a saw table where work pieces may be very accurately fed into a saw. Another object of the present invention is to provide a saw table that will prevent work pieces from shifting, bending, breaking, flipping or falling, during cutting operations. Another object of the present invention is to provide a saw table that will provide continuous support for work pieces that are being fed into a saw. Another object of the present invention is to provide a saw table that may be easily stored, conveniently shipped, and quickly, easily and conveniently assembled to a base of a radial arm saw. Another object of the present invention is to provide a saw table that is simple in construction, inexpensive, strong and durable, accurate and precise, reliable, and well adapted for the purposes for which it is designed. Other objects and advantages of the present invention will become apparent from a consideration of the following detailed description taken in connection with the accompanying drawings wherein a preferred embodiment of the invention is shown. It should be understood that the invention is not limited to the details disclosed, but includes all such variations and modifications as fall within the spirit of the invention and the scope of the appended claims.

The objectives of the present invention are accomplished by providing a table top that is slidably mounted on a pair of horizontal and parallel guide rails that may be fixed to the base of a radial arm saw. In the illustrated embodiment, two or more tubular members are coupled end-to-end by dowel connectors to form a rail. Each rail could comprise a single longer tubular member, however it has been found that two or more short tubes are easier to ship and store than a single long tube. The rails are held in horizontal and parallel spaced apart relationship by spacer bars at their distal ends, and are adapted to be detachably coupled to the base of a radial arm saw near the mid-points along their lengths. A protective end cap is placed over each end of each rail, and each end of each rail is supported on an adjustable length leg that is adapted to stand on the floor of a work area.

The table top in the illustrated embodiment has four slides or rings attached to the bottom which slides fit around the guide rails and allow the table to slide in reciprocating lengthwise movement relative to the guide rails, however the slides or rings prevent vertical and lateral movement of the table relative to the guide rails. A pair of handles are provided on the outside edge of the table. Work pieces are tightly clamped to the table, and an operator pushes or pulls on the handles to slide the table along the guides to feed work pieces into a saw. A plurality of recesses are provided in the top of the table top for receiving dowel pins and a plurality of dowel pins are provided for insertion into the recesses. The recesses are very accurately located in the surface of the table top, and the dowel pins, when inserted into the recesses, serve as a fence for locating work pieces, which are then tightly clamped to the slide table for feeding into a radial arm saw. The table is provided with a plurality of internally threaded tee-nuts that are inserted through the table top. Clamps having externally threaded shafts may be screwed into the tee-nuts and used to clamp work pieces to the table top.

Accurately positioned dowel pins allow more accurate location of work pieces on the table than is possible with a common fence. Clamping of work pieces to the work table reduces the risk of movement of work pieces during cutting operations. Work pieces are constantly supported during cutting operations, however the slide feature of the table allows a shorter and lighter table top to be used than would otherwise be the case. The risk of injury to an operator is greatly reduced since an operator is not required to be in contact with work pieces or to place his hands near a saw blade during cutting operations. Cutting accuracy is greatly improved due to better positioning and holding of work pieces and due to more uniform feeding of work pieces into the saw.

BRIEF DESCRIPTION OF THE DRAWINGS

A preferred embodiment of the present invention is illustrated in the accompanying drawings in which:

FIG. 6 is a partial view in perspective of the bottom of the table top of the present invention.

DESCRIPTION OF THE PREFERRED EMBODIMENT

Figure 1:
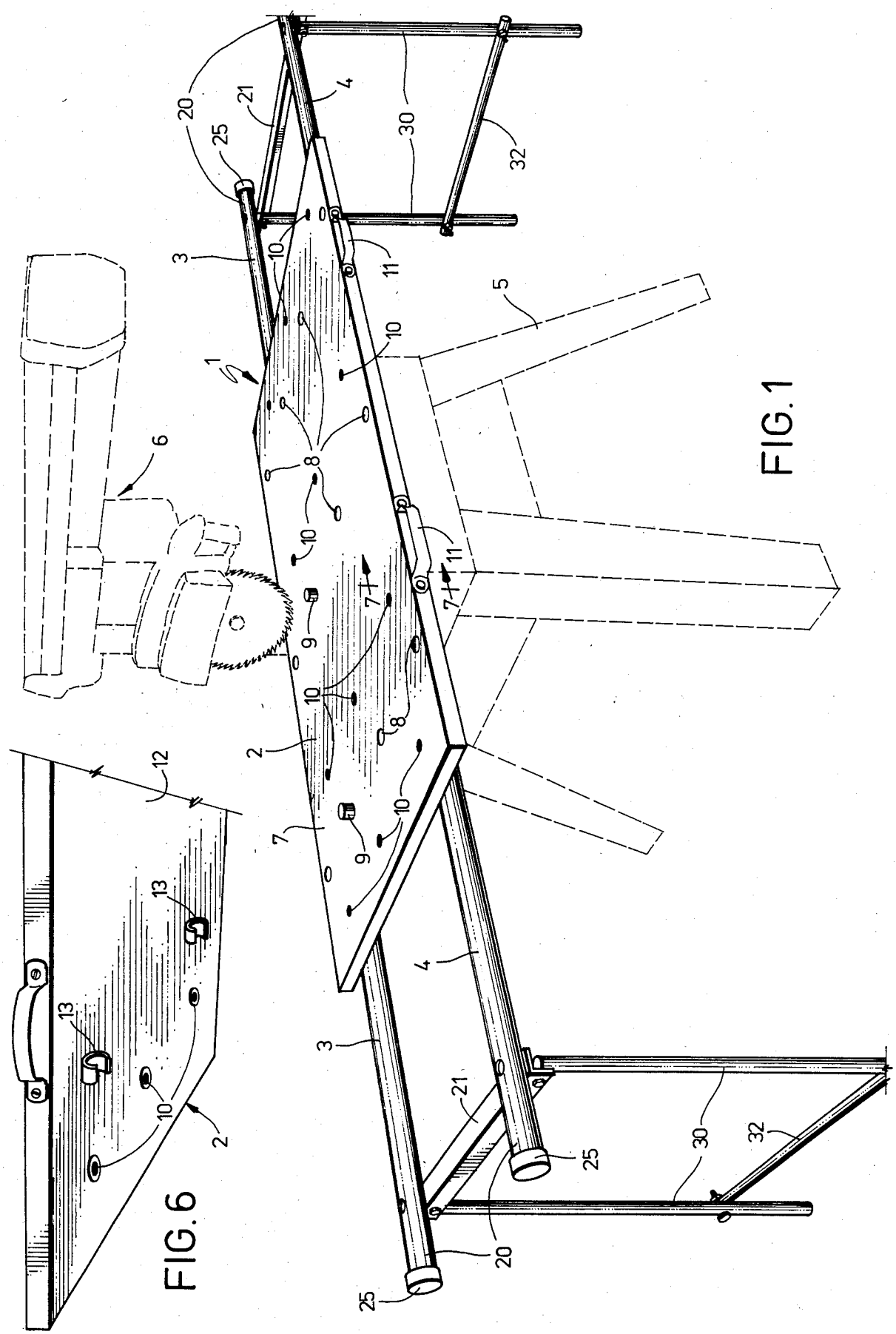
FIG. 1 is a view in perspective of the slide table of the present invention.

Referring now to the drawings in greater detail, FIGS. 1-7 illustrate the slide table of the present invention, shown generally at 1. The table 1 comprises a top 2 slidable mounted on a pair of parallel guide rails 3, 4 that are fixed to a base 5 of any radial saw 6 and are supported at their ends 20 on adjustable length legs 30.

Figure 2:
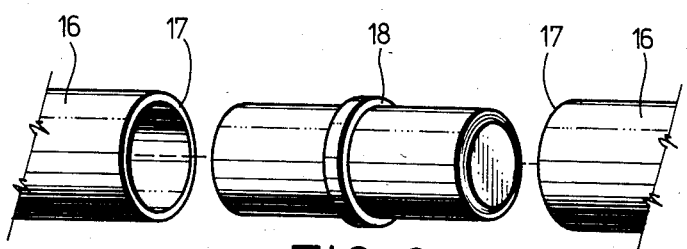
FIG. 2 is a view of the connection means for coupling rail members end-to-end.

In the illustrated embodiment, each rail 3, 4 comprises two or more tubular members 16 that are detachably coupled together at their ends 17 by wood dowels 18, in the manner shown in FIG. 2. While single unitary rails might be employed within the spirit and scope of my invention, I have found that the table 1 of the present invention may be more conveniently stored and shipped if each rail 3, 4 comprises two or more short tubes 16 rather than a single longer tube. It will also be apparent that structural shapes other than tubes like, for example, rods, angles, I-beams, etc. might be substituted as guide rails within the spirit and scope of my invention.

Figure 4:
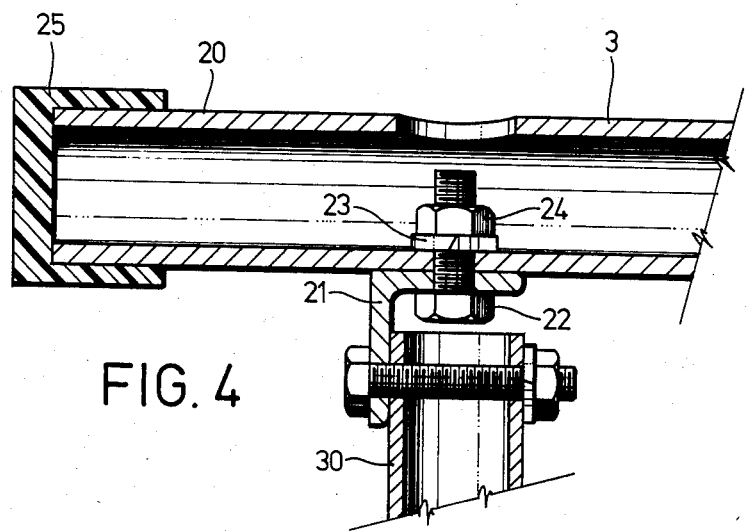
FIG. 4 is a sectional view showing the assembly of the guide rails of the present invention to the legs of the present invention.
Figure 3:
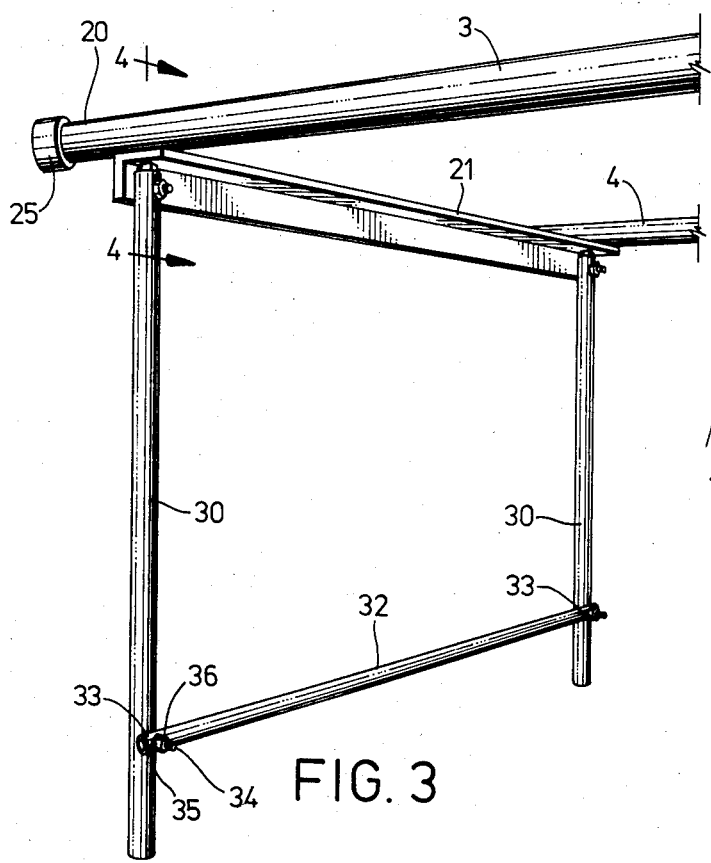
FIG. 3 is a view in perspective of the variable length legs of the present invention.

As shown in FIGS. 3 and 4, the rails 3, 4 are fixed at their ends 20 by suitable fastening means 22, 23, 24 in spaced apart relationship relative to each other by spacer bars 21. Each end 20 of each rail 3, 4 is provided with an end cap 25.

Extending downward from each spacer bar 21 are a pair of legs 30 adapted to support the ends 20 of the rails 3, 4 on a floor of a work area. A cross brace 32 is fixed at its ends 33 to the said legs 30 by suitable fastening means 34, 35, 36, to maintain parallelism between the said legs 30.

Figure 5:
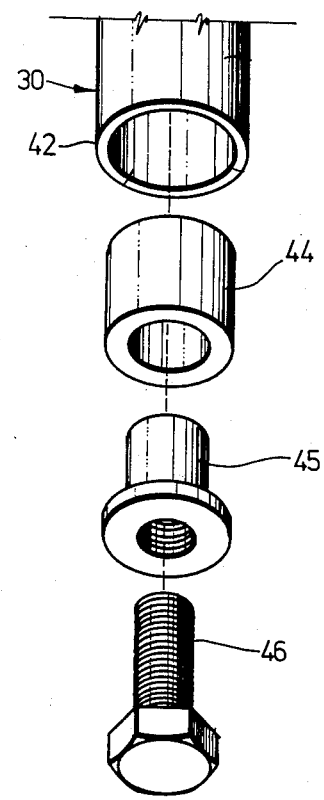
FIG. 5 is an exploded view in perspective showing the mechanism for adjusting the lengths of support legs of the present invention.

In the illustrated embodiment, each leg 30 comprises a tube adapted to support an end 20 of a rail 3, 4 above a work area floor. As shown in FIG. 5, a bushing 44 is press fitted into the opening at the lower end 42 of each leg 30 and an internally threaded tee-nut 45 is press fitted into each bushing 44. Each leg 30 is provided with a height adjustment screw 46 having threads thereon that are adapted to cooperate with the internal threads of a tee-nut 45 for raising and lowering an end 20 of a rail 3, 4. Fine adjustments to leg lengths and hence table height are made by turning the screws 46 in the tee-nuts 45.

Provided in the top surface 7 of the table top 2 and shown in FIG. 1 are a plurality of holes 8 each of which is adapted to receive any of a plurality of dowel fence pins 9 snugly and removably inserted therein.

Also provided is a plurality of internally threaded coupling means adapted to receive a plurality of clamp means detachably coupled thereto. As shown in FIGS. 1 and 6, each coupling means comprises a plurality of vertically oriented and internally threaded tee-nut 10 fixed in the table top 2. The tee-nuts 10 are adapted to receive externally threaded shafts of clamps threadably and removably inserted therein, said clamps being adapted to securely clamp work pieces to the table top 2. Handle means 11 are provided on the table 2 which means 11 are adapted to be grasped by an operator for sliding the top 2 in reciprocating lengthwise movement on the rails 3, 4.

Provided on the bottom side 12 of the top 2 as shown in FIG. 6 are slide means comprising four collars 13 fixed to the said bottom side 12 in spaced apart relationships relative to one another, said collars 13 being adapted to snugly and slidable engage the said guide rails 3, 4 and being adapted to severely restrict vertical and lateral movement of the said top 2 relative to the said rails 3, 4 while allowing lengthwise sliding movement of the said top 2 relative to the said rails 3, 4.

Figure 7:
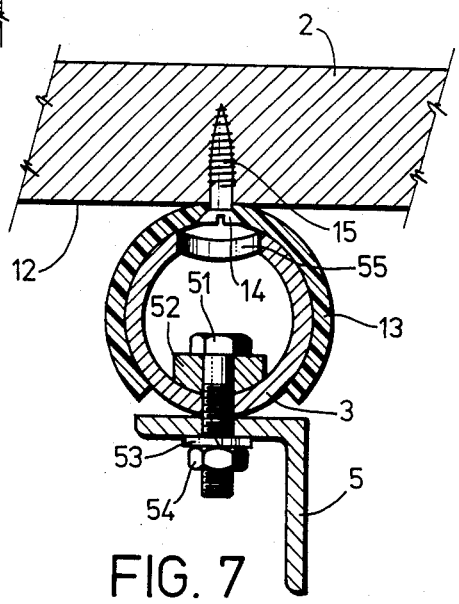
FIG. 7 is a sectional view showing the slide assembly to the table top and showing the guide rail assembly to the base of a radial arm saw.

As shown in FIG. 7, each collar 13 is fixed by suitable fastener means 15 to the bottom side 12 of the table 2. In the illustrated embodiment the said fastener means 15 comprises a countersunk wood screw.

As also shown in FIG. 7, each rail 3, 4 is adapted to be fixed by suitable fastening means to a base assembly 5 of any radial saw 6. In the illustrated embodiment the said fastening means comprises a cap screw 51, dowel spacer 52, lock washer 53, and nut 54. Access holes 55 are provided in the rails 3, 4, for assembling the said fastener means.

Having thus described my invention, what I now claim is:

1. A slide table comprising a table top having provided in the top surface thereof a plurality of recesses adapted to receive a plurality of fence pins removably inserted therein and a plurality of fence pins each of which is adapted to be removably inserted into any of the said recesses, the said table top having provided therethrough a plurality of internally threaded coupling means adapted to receive a plurality of clamp means detachably coupled thereto, the said table top having provided on the bottom thereof a plurality of slide means fixed in spaced apart relationship relative to each other, each of which slide means comprises a collar adapted to slidably engage a guide rail for reciprocating lengthwise movement relative thereto and each of which slide means is adapted to limit vertical and lateral movement of the said table top relative to a pair of guide rails, and wherein the said table top is provided with handle means adapted to be grasped by a person, and guide means comprising a pair of horizontal and parallel guide rails fixed by a plurality of suitable spacer means in spaced apart relationship relative to each other, wherein each of the said guide rails comprises a plurality of rail members detachably coupled together end-to-end by suitable coupling means and wherein each of the said guide rails is adapted to be detachably coupled to a base of a power saw, and means for supporting each end of each of the said guide rails, each means comprising an adjustable length leg depending vertically from a said guide rail and adapted to rest on the floor of a work area, said rails having provided on the ends thereof caps adapted to cover and protect the said ends of the said rails.

2. A slide table comprising a table top slidably mounted on guide means, the said table top and guide means being adapted to feed work pieces to a radial saw, wherein the said table top is provided in the top surface thereof with a plurality of recesses adapted to receive a plurality of fence pins removable inserted therein and a plurality of fence pins each of which is adapted to be removably inserted into any of the said recesses, and wherein the said table is adapted to receive a plurality of clamp means detachably coupled thereto, and wherein the said table top is provided on the bottom thereof with a plurality of slide means fixed in spaced apart relationship relative to each other, each of which slide means comprises a collar adapted to slidably engage a guide rail for reciprocating lengthwise movement relative thereto and is adapted to limit vertical and lateral movement of the said table top relative to the said guide rails, and wherein the said table top is provided with handle means adapted to be grasped by a person, and guide means comprising a pair of horizontal and parallel guide rails fixed by a plurality of suitable spacer means in spaced apart relationship relative to each other, wherein each of the said guide rails comprises a plurality of rail members detachably coupled together end-to-end by suitable coupling means and each of the said guide rails is adapted to be detachably coupled to a base of a power saw, and means for supporting each end of each of the said guide rails, each means comprising an adjustable length leg depending vertically from a said guide rail and adapted to rest on the floor of a work area.

* * * * *